United States Patent
Ericson et al.

(10) Patent No.: US 11,818,653 B2
(45) Date of Patent: Nov. 14, 2023

(54) RADIO UNIT AND A METHOD THEREIN FOR CONTROLLING POWER LEVELS OF SPATIALLY SEPARATED TRANSCEIVERS IN A WIRELESS COMMUNICATIONS NETWORK

(71) Applicant: Telefonaktiebolaget LM Ericsson (publ), Stockholm (SE)

(72) Inventors: Mårten Ericson, Luleå (SE); Peter De Bruin, Gammelstad (SE); Magnus Thurfjell, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/548,437

(22) PCT Filed: Feb. 20, 2015

(86) PCT No.: PCT/EP2015/053578
§ 371 (c)(1),
(2) Date: Aug. 3, 2017

(87) PCT Pub. No.: WO2016/131491
PCT Pub. Date: Aug. 25, 2016

(65) Prior Publication Data
US 2018/0027491 A1    Jan. 25, 2018

(51) Int. Cl.
*H04W 52/34* (2009.01)
*H04W 28/02* (2009.01)
(Continued)

(52) U.S. Cl.
CPC ... *H04W 52/0206* (2013.01); *H04W 28/0221* (2013.01); *H04W 52/241* (2013.01);
(Continued)

(58) Field of Classification Search
CPC ......... H04W 28/0221; H04W 52/0206; H04W 52/143; H04W 52/241
See application file for complete search history.

(56) References Cited

U.S. PATENT DOCUMENTS 6,519,236 B1 *  2/2003  Haartsen ............... H04W 52/42
                                                      370/332
9,380,604 B1 *  6/2016  Amiri .................. H04B 17/336
(Continued)

FOREIGN PATENT DOCUMENTS

JP     2012005015 A    1/2012
JP     2012100090 A    5/2012
(Continued)

OTHER PUBLICATIONS

CMCC, "General views on backhaul signalling for CoMP-NIB", 3GPP TSG RAN WG3 Meeting #83, Feb. 10-14, 2014, pp. 1-4, Prague, Czech Republic, R3-140069.

*Primary Examiner* — Wutchung Chu
*Assistant Examiner* — Berhanu D Belete
(74) *Attorney, Agent, or Firm* — COATS & BENNETT, PLLC

(57) ABSTRACT

Embodiments herein relate to a method performed by a radio unit (101) for controlling power levels of spatially separated transceivers (110-119) connected to the radio unit (101) via corresponding antenna ports (a-j). Each transceiver (110-119) is capable of performing measurements on uplink transmissions from wireless devices in a wireless communication network (100). The radio unit (101) receives, from each transceiver (110-119), measurements on uplink transmissions from wireless devices. Then, the radio unit (101) determines, for each transceiver (110-119), a load based on how many wireless devices that have the transceiver as the transceiver with the most relevant measurement for its uplink transmissions. The radio unit (101) also controls a
(Continued)

power level of at least one first transceiver (110) based on at least one of the determined loads for the transceivers (110-119). Embodiments of the radio unit (101) are also described.

22 Claims, 3 Drawing Sheets

(51) Int. Cl.
| | |
|---|---|
| H04W 52/02 | (2009.01) |
| H04W 52/38 | (2009.01) |
| H04W 52/24 | (2009.01) |
| H04W 52/40 | (2009.01) |
| H04W 52/14 | (2009.01) |
| H04W 88/08 | (2009.01) |
| H04W 52/28 | (2009.01) |

(52) U.S. Cl.
CPC ....... *H04W 52/343* (2013.01); *H04W 52/386* (2013.01); *H04W 52/143* (2013.01); *H04W 52/283* (2013.01); *H04W 52/285* (2013.01); *H04W 52/40* (2013.01); *H04W 88/085* (2013.01); *Y02D 30/70* (2020.08)

(56) References Cited

U.S. PATENT DOCUMENTS

| | | | | |
|---|---|---|---|---|
| 9,408,095 | B2 | 8/2016 | Lightstone et al. | |
| 2002/0077113 | A1* | 6/2002 | Spaling | H04W 24/08 455/450 |
| 2003/0222818 | A1* | 12/2003 | Regnier | H01Q 3/36 342/383 |
| 2004/0253955 | A1* | 12/2004 | Love | H04B 7/0814 455/442 |
| 2005/0181812 | A1* | 8/2005 | Scheck | H04W 64/00 455/88 |
| 2006/0109925 | A1* | 5/2006 | Kannan | H04L 5/0044 375/260 |
| 2007/0242766 | A1* | 10/2007 | Xu | H04L 1/0025 375/260 |
| 2008/0069062 | A1* | 3/2008 | Li | H04W 52/30 370/338 |
| 2009/0016317 | A1* | 1/2009 | Wu | H04W 72/56 370/347 |
| 2009/0019113 | A1* | 1/2009 | Wu | H04L 12/1881 709/204 |
| 2009/0202020 | A1* | 8/2009 | Hafeez | H04B 7/022 375/299 |
| 2009/0310544 | A1* | 12/2009 | Jain | H04L 45/24 370/329 |
| 2010/0039972 | A1* | 2/2010 | Wang | H04W 52/12 455/67.11 |
| 2010/0165934 | A1* | 7/2010 | Tayloe | H04W 52/262 370/329 |
| 2010/0211359 | A1* | 8/2010 | Mehta | H04L 67/12 702/188 |
| 2010/0240371 | A1* | 9/2010 | Cook | H04W 36/00837 455/436 |
| 2010/0322070 | A1* | 12/2010 | Wang | H04L 47/125 370/230 |
| 2011/0028181 | A1* | 2/2011 | Byun | H04W 36/0085 455/67.11 |
| 2011/0222434 | A1* | 9/2011 | Chen | H04W 52/241 370/254 |
| 2011/0223961 | A1* | 9/2011 | Chen | H04W 52/267 455/522 |
| 2012/0082035 | A1* | 4/2012 | Jain | H04W 40/12 370/336 |
| 2012/0158932 | A1* | 6/2012 | Grohman | H04L 12/2838 709/223 |
| 2012/0207040 | A1* | 8/2012 | Comsa | H04W 72/1215 370/252 |
| 2012/0214528 | A1* | 8/2012 | Hashimoto | H04B 7/0413 455/509 |
| 2012/0327795 | A1* | 12/2012 | Mallik | H04B 17/345 370/252 |
| 2013/0083685 | A1* | 4/2013 | Lee | H04B 7/0641 370/312 |
| 2013/0094433 | A1 | 4/2013 | Nagata et al. | |
| 2013/0122947 | A1* | 5/2013 | Li | H04W 52/383 455/501 |
| 2013/0150113 | A1* | 6/2013 | Alamshahi | H04W 88/085 455/517 |
| 2013/0194939 | A1* | 8/2013 | Kaukovuori | H04B 15/04 370/252 |
| 2013/0272132 | A1* | 10/2013 | Heo | H04W 28/0268 370/236.2 |
| 2013/0281049 | A1 | 10/2013 | Lee et al. | |
| 2013/0301526 | A1* | 11/2013 | Zhu | H04L 5/0091 370/328 |
| 2014/0043997 | A1* | 2/2014 | Anderson | H04L 5/14 370/252 |
| 2014/0105056 | A1* | 4/2014 | Li | H04W 52/0206 370/252 |
| 2014/0126530 | A1* | 5/2014 | Siomina | H04W 52/146 370/330 |
| 2014/0169415 | A1* | 6/2014 | Werner | H04B 7/0456 375/267 |
| 2014/0233442 | A1* | 8/2014 | Atias | H04W 52/0206 370/311 |
| 2014/0247895 | A1* | 9/2014 | Shattil | H04L 27/01 375/267 |
| 2014/1370930 | | 12/2014 | Kurokochi et al. | |
| 2015/0016312 | A1* | 1/2015 | Li | H04W 74/006 370/280 |
| 2015/0085686 | A1* | 3/2015 | Chande | H04W 72/542 370/252 |
| 2015/0189603 | A1* | 7/2015 | Weber | H04W 24/08 370/252 |
| 2015/0237642 | A1* | 8/2015 | Ihm | H04L 5/0048 370/329 |
| 2015/0271727 | A1* | 9/2015 | Harrang | H04L 47/122 370/229 |
| 2015/0341439 | A1* | 11/2015 | Mehta | H04Q 9/00 702/188 |
| 2015/0358921 | A1* | 12/2015 | Karlsson | H04W 52/146 370/252 |
| 2016/0037463 | A1* | 2/2016 | Siomina | H04W 52/365 370/330 |
| 2016/0173239 | A1* | 6/2016 | Kim | H04L 1/1812 370/329 |
| 2016/0329920 | A1* | 11/2016 | Li | H04B 15/005 |
| 2016/0330604 | A1* | 11/2016 | Kim | H04W 74/0833 |
| 2017/0118677 | A1* | 4/2017 | Axelsson | H04W 36/22 |
| 2017/0126339 | A1* | 5/2017 | Skärby | H04B 17/345 |
| 2017/0339660 | A1* | 11/2017 | Kazmi | H04W 64/003 |

FOREIGN PATENT DOCUMENTS

| | | |
|---|---|---|
| RU | 2160502 C1 | 12/2000 |
| WO | 9967888 A1 | 12/1999 |
| WO | 2011112476 A1 | 9/2011 |
| WO | 2013044957 A1 | 4/2013 |
| WO | 2013140491 A1 | 9/2013 |
| WO | 2015020033 A1 | 2/2015 |
| WO | 2015150874 A1 | 10/2015 |

* cited by examiner

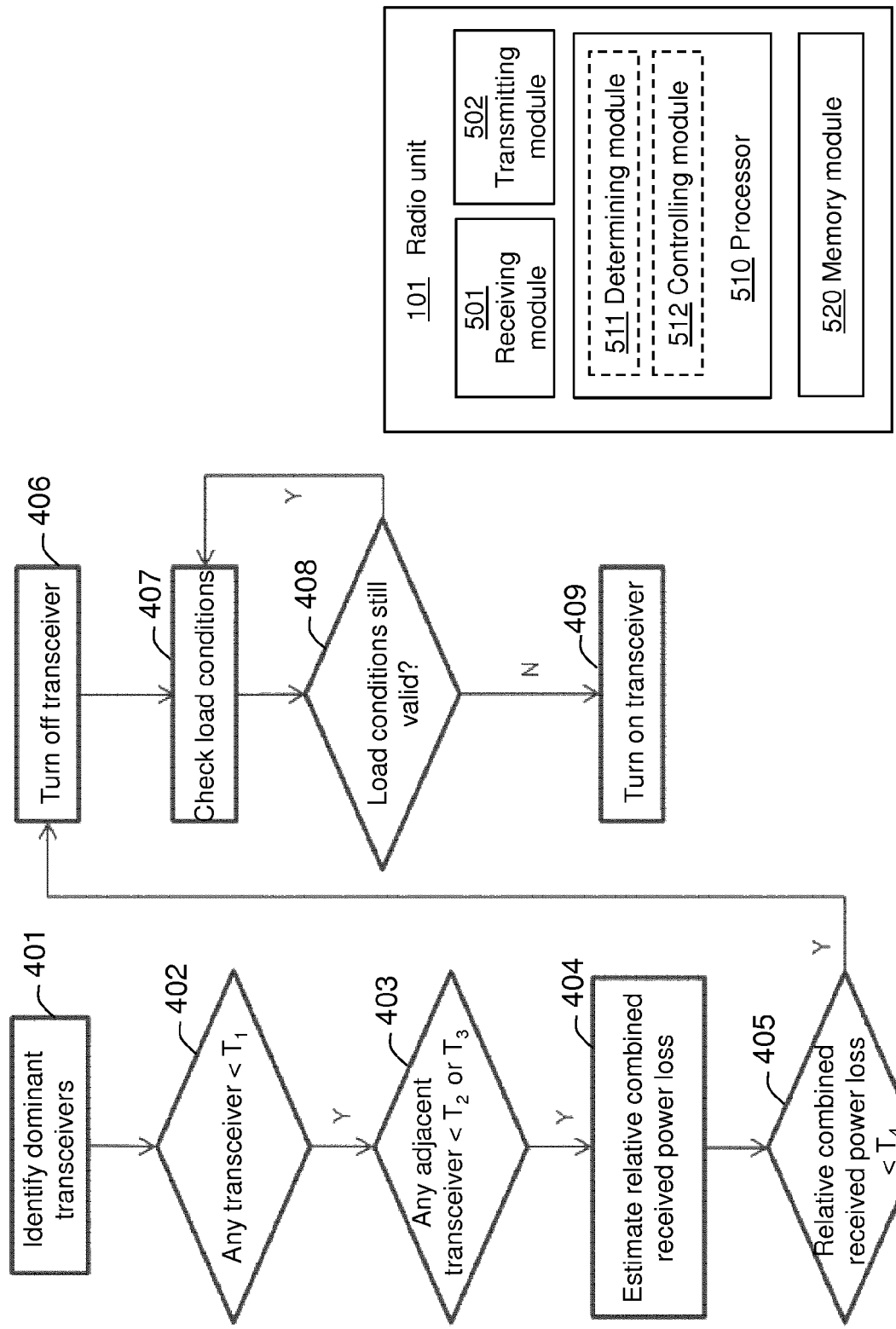

RADIO UNIT AND A METHOD THEREIN FOR CONTROLLING POWER LEVELS OF SPATIALLY SEPARATED TRANSCEIVERS IN A WIRELESS COMMUNICATIONS NETWORK

TECHNICAL FIELD

Embodiments herein relate to power control in a wireless communications network. In particular, embodiments herein relate to a radio unit and a method therein for controlling power levels of spatially separated transceivers connected to the radio unit via corresponding antenna ports.

BACKGROUND

In a typical wireless, cellular or radio communications network, wireless devices, also known as mobile stations, terminals, and/or User Equipment, UEs, communicate via a Radio-Access Network, RAN, with one or more core networks. The RAN covers a geographical area which is divided into cells, with each cell being served by a base station, e.g. a radio base station, RBS, or network node, which in some networks may also be called, for example, a "NodeB", "eNodeB" or "eNB". A cell is a geographical area where radio coverage is provided by the radio base station at a base station site or an antenna site in case the antenna and the radio base station are not collocated. One radio base station may serve one or more cells.

A Universal Mobile Telecommunications System, UMTS, is a third generation mobile communication system, which evolved from the second generation, 2G, Global System for Mobile Communications, GSM. The UMTS terrestrial radio-access network, UTRAN, is essentially a RAN using wideband code-division multiple access, WCDMA, and/or High-Speed Packet Access, HSPA, to communicate with user equipment. In a forum known as the Third Generation Partnership Project, 3GPP, telecommunications suppliers propose and agree upon standards for third generation networks and UTRAN specifically, and investigate enhanced data rate and radio capacity. In some versions of the RAN, as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio-Access Network, E-UTRAN, also known as the Long-Term Evolution, LTE, radio access, and the Evolved Packet Core, EPC, also known as System Architecture Evolution, SAE, core network. E-UTRAN/LTE is a variant of a 3GPP radio-access technology wherein the radio base station nodes are directly connected to the EPC core network rather than to RNCs. In general, in E-UTRAN/LTE the functions of a RNC are distributed between the radio base station nodes, e.g. eNodeBs in LTE, and the core network. As such, the Radio-Access Network, RAN, of an EPS has an essentially flat architecture comprising radio base station nodes without reporting to RNCs.

While the above describe wireless communication networks as conventionally deployed in an outdoor setting, it is also becoming more and more important to have proper indoor coverage as well. To enable this, an indoor wireless communication network is typically installed, since the outdoor, or macro, wireless communication network is usually not capable of providing a good enough indoor performance.

An indoor wireless communication network may be referred to as a distributed system, since it often comprises several spatially separated transceivers, e.g. antennas or radio heads, with low transmit power that are geographically distributed throughout an indoor environment, such as, for example, across hallways and offices on several different floors of a building. In order to achieve a good coverage in this type of indoor environment, it is often necessary to employ a large number of the low-transmit-power-transceivers per floor of a building. For example, a typical deployment may be around one transceiver every 25 meters, or one transceiver for every 625 square meters.

One reason for the relatively high number of transceivers per meter is the relatively low transmit power per antenna or radio head. Another reason is the radio propagation losses due to walls and floors, as well as, other indoor obstacles. Yet another reason is that a typical indoor wireless communication network is usually configured to provide a dominating signal over macro signals of outdoor wireless communication networks, often with several decibels in almost every indoor location.

Because of the large number of transceivers used, there is a continuous need to reduce the energy consumption and interference in these types of wireless communications network. In other words, there is a need to improve the efficiency of such wireless communications networks in this respect.

SUMMARY

It is an object of embodiments herein to improve the efficiency of spatially separated transceivers connected to a radio unit of a wireless communications network in terms of energy conservation and interference.

According to a first aspect of embodiments herein, the object is achieved by a method performed by a radio unit for controlling power levels of spatially separated transceivers connected to the radio unit via corresponding antenna ports. Each transceiver is capable of performing measurements on uplink transmissions from wireless devices in a wireless communication network. The radio unit receives measurements from the transceivers on received uplink transmissions from the wireless devices. Also, the radio unit determines, for each transceiver, a load based on how many wireless devices that have the transceiver as the transceiver with the most relevant measurement for its uplink transmissions. Further, the radio unit controls a power level of at least one first transceiver based on at least one of the determined loads for the transceivers.

According to a second aspect of embodiments herein, the object is achieved by a radio unit for controlling power levels of spatially separated transceivers connected to the radio unit via corresponding antenna ports. Each transceiver is capable of performing measurements on uplink transmissions from wireless devices in a wireless communication network. The radio unit comprises a receiver and a processor. The receiver is configured to receive measurements from the transceivers on received uplink transmissions from the wireless devices, and the processor is configured to determine a load based on how many wireless devices that have the transceiver as the transceiver with the most relevant measurement for its uplink transmissions, and control a power level of at least one first transceiver based on at least one of the determined loads for the transceivers.

According to a third aspect of embodiments herein, the object is achieved by a computer program, comprising instructions which, when executed on at least one processor, cause the at least one processor to carry out the method described above. According to a fourth aspect of embodiments herein, the object is achieved by a carrier containing the computer program described above, wherein the carrier is one of an electronic signal, optical signal, radio signal, or computer readable storage medium.

By determining the number of wireless devices that perceive a certain transceiver as dominant, i.e. as the transceiver having the most relevant measurement, such as, for example, highest received power, highest signal-to-noise-ratio or highest signal quality, for its uplink transmissions, the radio unit is able to determine a load per transceiver in terms of number of wireless devices that perceive a transceiver as dominant. The radio unit may then control the power levels of the transceivers which have low determined loads, for example, by turning them off or reducing their output power. Hence, the energy consumption of the spatially separated transceivers in the wireless communications network may be reduced. Also, by turning transceivers off or reducing their output power, interference caused by the spatially separated transceivers in the wireless communications network is reduced. Thus, the efficiency of spatially separated transceivers connected to a radio unit of a wireless communications network in terms of energy conservation and interference is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 4 is another flowchart depicting embodiments of a method in a radio unit, FIG. 5 is a schematic block diagram depicting embodiments of a radio unit.

DETAILED DESCRIPTION

Figure 1:
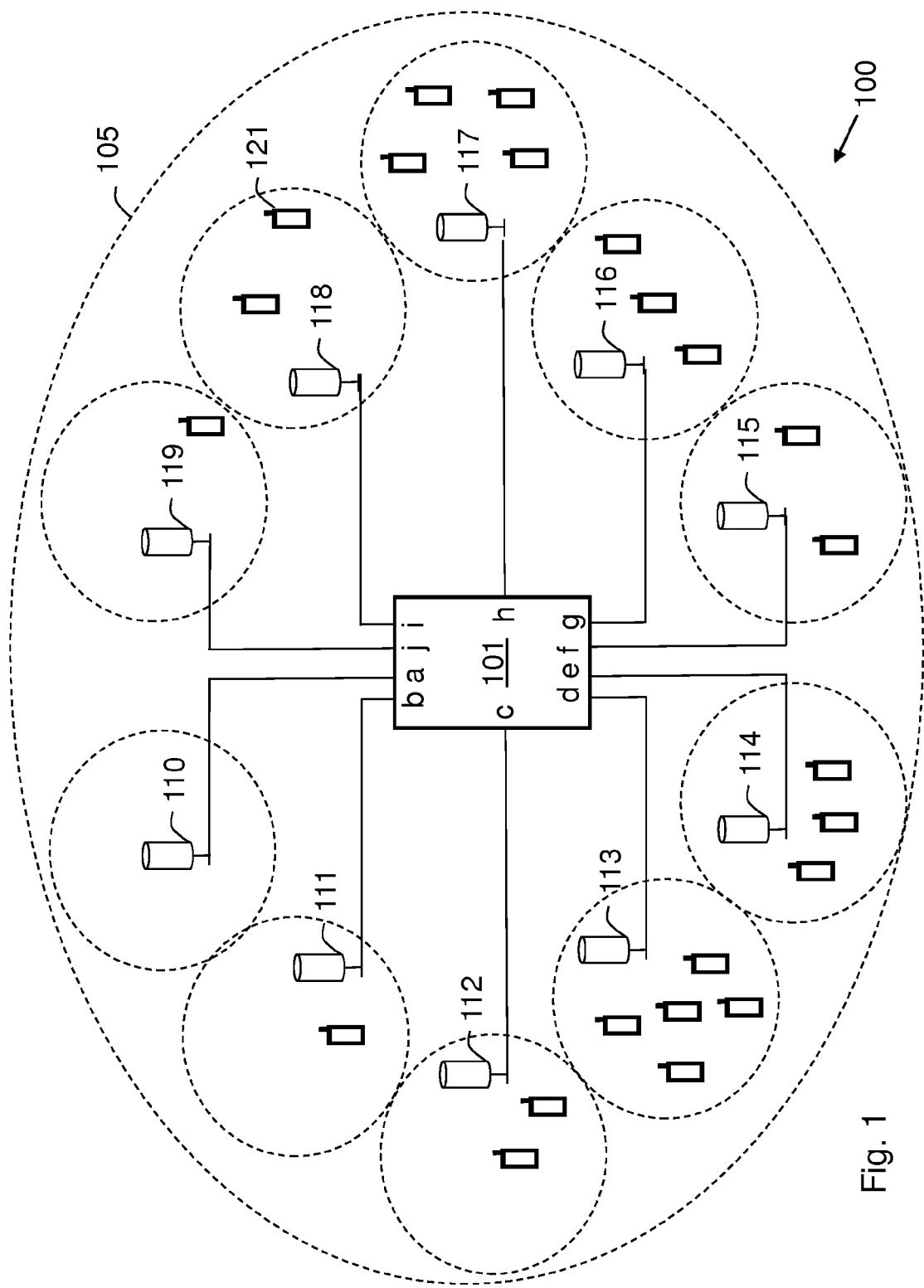
FIG. 1 is a schematic block diagram illustrating embodiments a radio unit in a wireless communications network.

The figures are schematic and simplified for clarity, and they merely show details which are essential to the understanding of the embodiments presented herein, while other details have been left out. Throughout, the same reference numerals are used for identical or corresponding parts or steps.

FIG. 1 shows an example of a wireless communications network 100 in which embodiments herein may be implemented. The wireless communications system 100 may also be referred to as an indoor wireless communication network, since it is advantageously deployed in an indoor environment.

The wireless communications system 100 comprises a radio unit 101 connected to a number of transceivers 110-119. Each transceiver 110-119 is connected to a separate antenna port a-j, respectively, of the radio unit 101. The connection between each transceiver 110-119 and its corresponding antenna port of the radio unit 101 is a wired or wireless connection. The radio unit 101 and the transceivers 110-119 may be said to provide coverage within the cell 105, and each transceiver 110-119 to provide coverage within its own coverage area, as indicated by the dashed circles in FIG. 1. The radio unit 101, which is also be referred to as a baseband unit or digital unit, may be connected to a core network of a communications network, such as, for example, a core network of an outdoor, or macro, wireless communications network as described above.

According to some aspects, each transceiver 110-119 is an antenna and/or radio head further capable of detecting and measure uplink, UL, transmissions from wireless devices, such as, e.g. the wireless device 121 in FIG. 1, located within their coverage area. Conventionally, indoor wireless communication networks do not allow separate cells or data flows per transceiver, and a pre-requisite to using separate cells in indoor wireless communications networks is the possibility to detect and measure uplink transmission from wireless devices located within the coverage of the indoor wireless communications network.

However, one way of evaluation the received power or signal strength of such wireless devices at the transceivers 110-119 is to include a unique, small frequency offset in the Local Oscillator, LO, of the transceivers 110-119, such that signals from each transceiver 110-119 may be separated and dealt with individually in the radio unit 101. Another way of evaluating the signal strength of such wireless devices at the transceivers 110-119 is to perform digital filtering in the radio unit 101 on selected uplink transmission signals of the transceivers 110-119, for example, before all the transceiver signals are summed in the radio unit 101.

According to some aspects, the wireless devices in the wireless communications network 100 in FIG. 1 are e.g. any kind of wireless devices such as mobile phones, cellular phones, Personal Digital Assistants (PDAs), smart phones, tablets, sensors or actuators with wireless communication capabilities, sensors or actuators connected to or equipped with a wireless device, Machine Devices (MD), Machine-Type-Communication (MTC) devices, Machine-to-Machine (M2M) communication devices, Customer-Premises Equipments (CPEs), Laptop-Mounted Equipments (LMEs), Laptop-Embedded Equipments (LEEs), etc. Furthermore, although embodiments below are described with reference to the scenario of FIG. 1, this scenario should not be construed as limiting to the embodiments herein, but merely as an example made for illustrative purposes.

As part of developing the embodiments herein, it has been noticed that in these types of indoor wireless communication networks, there is normally periods of time when there is relatively few wireless devices active per cell and even fewer wireless devices active per transceiver. This means that the indoor data traffic per transceiver in these wireless communication networks may be more sporadic compared to the data traffic in outdoor, or macro, wireless communication networks. This also means that some transceivers that are located far away from wireless devices that are transmitting or receiving data in the wireless communication network, may not effectively contribute to the data transmission. Hence, these transceivers may, for these periods of time, be considered to be inefficient from an energy consumption point of view, and also unnecessarily contribute to interference towards other cells in the wireless communication network.

In accordance with the embodiments described herein, this is addressed by having a radio unit capable of determining the number of wireless devices that consider a certain transceiver as dominant, i.e. the transceiver with the most relevant measurement, such as, for example, highest received power, highest signal-to-noise-ratio or highest signal quality, for the uplink transmissions of the wireless device. This enables the radio unit to determine a load per transceiver, i.e. in terms of number of wireless devices that perceive a transceiver as dominant, and control the power levels of the transceivers which have low determined loads. Hence, the energy consumption of these transceivers in the wireless communications network may be reduced, as well as, any interference caused by these transceivers in the wireless communications network. Thus, the efficiency of spatially separated transceivers connected to a radio unit of a wireless communications network in terms of energy conservation and interference is improved.

Figure 2:
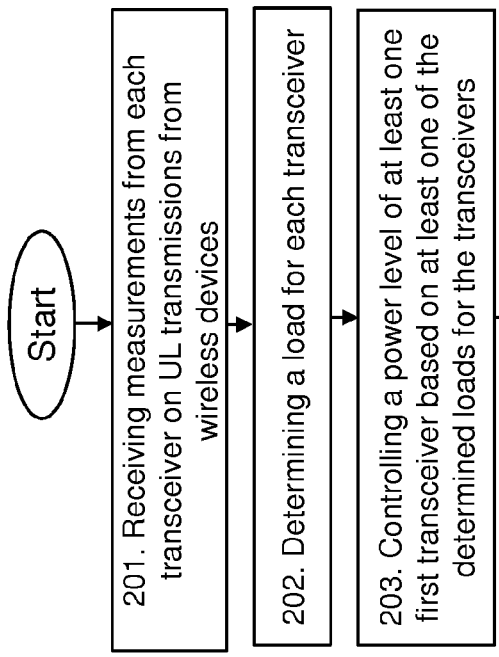
FIG. 2 is a flowchart depicting embodiments of a method in a radio unit.

Example of embodiments of a method performed by a radio unit 101 for controlling power levels of spatially separated transceivers 110-119 connected to the radio unit 101 via corresponding antenna ports a-j, will now be described with reference to the flowchart depicted in FIG. 2. Here, each transceiver 110-119 is capable of performing measurements on uplink transmissions from wireless devices in a wireless communication network 100. FIG. 2 illustrates an example of actions or operations which may be taken by the radio unit 101. The method may comprise the following actions.

Action 201

The radio unit 101 first receives measurements from the transceivers 110-119 on received uplink transmissions from the wireless devices. This means that each of the transceivers 110-119 signal their measurements on received UL transmissions from the wireless devices currently located within their individual coverage areas to the radio unit 101. According to some aspects, the measurements referred to above are received power measurements (e.g. received UL power or signal strength values), signal-to-noise-ratio measurements, or signal quality measurements. It is here assumed that the radio unit 101 and/or transceivers 110-119 is able to detect and estimate the received UL power per transceiver 110-119 per wireless device in the wireless communications network 100.

In some embodiments, the transceivers 110-119 are antennas and/or radio heads. It should also be noted that, according to some embodiments, each of the transceivers 110-119 is located at a specific geographical position relative to the other transceivers 110-119.

Action 202

In response to receiving the measurements from the transceivers 110-119 in Action 201, the radio unit 101 determines, for each transceiver 110-119, a load based on how many wireless devices that have the transceiver as the transceiver with the most relevant measurement for its uplink transmissions. Here, the most relevant measurement of a wireless device is the measurement which has the highest path gain, e.g. in terms of highest received power, highest signal-to-noise-ratio, highest signal quality measurements, etc., of all measurements received from the transceivers 110-119 in Action 201 for the wireless device. This one of the transceivers 110-119 is then considered as dominant to that wireless device.

In this way, the radio unit 101 may determine the number of wireless devices that consider a certain transceiver as dominant, e.g. having the highest received power or highest path gain. Thus, the radio unit 101 is informed about the load of each transceiver 110-119 in the wireless communications network 100; the load for a transceiver here being the number of wireless devices in the wireless communications network 100 that have the transceiver as its dominant transceiver. Consequently, the radio unit 101 is also informed about which transceivers 110-119 have a high load in the wireless communications network 100, i.e. a transceiver which many wireless devices in the wireless communications network 100 have as its dominant transceiver, or low load in the wireless communications network 100, i.e. a transceiver which few or no wireless devices in the wireless communications network 100 have as its dominant transceiver.

In some embodiments, the most relevant measurement may be one or more of: the highest received power, the highest signal-to-noise-ratio, or the highest signal quality. For example, according to some aspects, for a wireless device u, the radio unit 101 is able to find the transceiver i with the highest received UL power according to Eq. 1:

$$i = \text{maxind}\{P_u^{rx}\}, \qquad (\text{Eq. 1})$$

wherein $P_u^{rx}$ is the vector of the received uplink power values from the wireless device u to all transceivers 110-119 forming the cell 105, such as, for example, $P_u^{rx} = [p_1^{rx}, p_2^{rx} \ldots p_N^{rx}]$ for N number of transceivers.

The transceiver with the highest received power from a wireless device is considered to be the dominant transceiver for this particular wireless device. The load of transceiver i is then defined as the number of wireless devices with transceiver i as its dominant transceiver. It should also be noted that the transceiver with highest received power $p_i^{rx}$ from a wireless device also corresponds to the transceiver with the highest path gain $g_i$.

Action 203

After determining the loads for each transceiver 110-119 in Action 202, the radio unit 101 controls a power level of at least one first transceiver based on at least one of the determined loads for the transceivers 110-119. This means that the radio unit 101 controls, or at least affects, the energy consumption and possible interference in the wireless communications network 100 based on the determined loads of the transceivers 110-119.

In some embodiments, the radio unit 101 turns off the at least one first transceiver or reduce the output power level for downlink transmissions of the at least one first transceiver. This is performed by the radio unit 101 when a first load criterion is fulfilled. Correspondingly, when a second load criterion is fulfilled, the radio unit 101 turns on the at least one first transceiver or increase the output power level for downlink transmissions of the at least one first transceiver. This allows the radio unit 101 to reduce the energy consumption and possible interference in the wireless communications network 100 when deemed suitable according to a first and second criterion in the radio unit 101. Furthermore, it also allows the radio unit 101 to not only turn off a transceiver completely, but also reduce the output power of the downlink, DL, transmissions of a transceiver such that the transceiver may still detect wireless devices in the wireless communications network 100.

In some embodiments, the first load criterion is considered fulfilled when the determined load for the at least one first transceiver is equal to or below a first determined threshold. This means that the radio unit 101 may consider turning off, or reducing the output power level for DL transmissions of, a transceiver when the determined load of the transceiver does not exceed the first determined threshold. Advantageously, this allows the radio unit 101 to identify possible transceivers that the radio unit 101 may use for reducing the energy consumption and possible interference in the wireless communications network 100, i.e. transceivers that have a low load in the wireless communications network 100.

Correspondingly, in such embodiments, the second load criterion is considered fulfilled when the determined load for the at least one first transceiver is above the first determined threshold. This means that the radio unit 101 may consider turning on or increasing the output power level for DL transmissions of a transceiver when the determined load of the transceiver exceeds the first threshold. This allows the radio unit 101 to identify transceivers that the radio unit 101 may no longer use for reducing the energy consumption and possible interference in the wireless communications network 100, i.e. transceivers that no longer have a low load in the wireless communications network 100.

In some embodiments, the first load criterion is considered fulfilled when the determined load for at least one second transceiver located adjacent to the at least one first transceiver is equal to or below a second determined threshold. This means that the radio unit 101 may also consider the determined loads of neighboring transceivers of a transceiver when determining whether or not it should turn off or reduce output power level for DL transmissions of the transceiver. This may be performed because, when a transceiver is turned off, the radio unit 101 will not be able to use this transceiver for reception of transmissions from wireless device and wireless devices attempting to access the wireless communications network 100 via the transceiver, e.g. performing a random access attempt, may thus fail. To avoid this, the determined load of adjacent or neighboring transceivers may be included in the consideration whether or not it should turn off or reduce output power level for DL transmissions of the transceiver. For example, if the determined load is high for the neighboring transceivers, this will indicate that there is a high probability that a wireless device may move into the coverage area of the transceiver. However, if the determined load is low for the neighboring transceivers, this will indicate that there is a low probability that a wireless device may move into the coverage area of the transceiver.

Correspondingly, in such embodiments, the second load criterion is considered fulfilled when the determined load for at least one second transceiver located adjacent to the at least one first transceiver is above the second determined threshold. This means that the radio unit 101 may further consider the determined loads of neighboring transceivers of a transceiver when determining whether or not it should turn on or increase the output power level for DL transmissions of the transceiver. This allows the radio unit 101 to determine whether there is a high or low probability that a wireless device may move into the coverage area of a transceiver that is turned off or has a reduced output power of its DL transmissions.

In some embodiments, the first load criterion is considered fulfilled when the determined load for at least one third transceiver located adjacent to the at least one second transceiver is equal to or below a third determined threshold. This means that the radio unit 101 may also consider the determined loads of the transceivers being neighbors to the neighboring transceivers of a transceiver when determining whether or not it should turn off or reduce output power level for DL transmissions of the transceiver. This allows the radio unit 101 to determine whether there is a high or low probability that a wireless device may move into the coverage area of a transceiver even further. Correspondingly, in such embodiments, the second load criterion is considered fulfilled when the determined load for at least one third transceiver located adjacent to the at least one second transceiver is above the third determined threshold. Correspondingly, this means that the radio unit 101 may further consider the determined loads of the neighbors of the neighboring transceivers of a transceiver when determining whether or not it should turn on or increase the output power level for DL transmissions of the transceiver. This allows the radio unit 101 to determine whether there is a high or low probability that a wireless device may move into the coverage area of a transceiver that is turned off or has a reduced output power of its DL transmissions even further.

In some embodiments, the first load criterion is considered fulfilled when an estimated loss in relative combined received power of the uplink transmissions from the wireless devices to the transceivers 110-119 is equal to or below a fourth determined threshold. Also, here, the second load criterion is considered fulfilled when an estimated loss in relative combined received power of the uplink transmissions from the wireless devices to the transceivers 110-119 is above the fourth determined threshold. This means that, besides checking the determined load of a transceiver, the determined loads of neighboring transceivers of the transceiver, and the determined loads of transceivers being neighbors to the neighboring transceivers of the transceiver and comparing them to the first, second and third determined thresholds, respectively, the radio unit 101 may also consider the relative combined received power when determining whether or not it should turn off or reduce output power level for DL transmissions of the transceiver. This allows the radio unit 101 to refrain from turning a transceiver off, or reduce the output power level for its DL transmissions, when the transceiver provides a significant combined power contribution for transmission from wireless devices for which it is not a dominant transceiver. In other words, any wireless devices being served by the transceiver, its neighboring transceivers and/or transceivers being neighbors to the neighboring transceivers, should not experience a loss in combined gain from these transceivers that is above a fourth determined threshold if the radio unit 101 turns off the transceiver or reduces the output power level for the transceivers DL transmissions.

For example, for each wireless device being served by the transceiver k, the neighboring transceivers of the transceiver k, and/or transceivers being neighbors to the neighboring transceivers of the transceiver k, the radio unit 101 may determine a total received power, $\overline{P_{tot}^{rx}}$, according to Eq. 2:

$$P_{tot}^{rx} = \sum_{n=1...N} p_n^{rx} \tag{Eq. 2}$$

wherein p is the received power from the n:th transceiver, and

N is the number of transceivers.

After determining the total received power, $P_{tot}^{rx}$, for each wireless device, the radio unit 101 may determine that the relative received power loss per wireless device for the transceiver k according to Eq. 3:

$$\frac{p_k^{rx}}{P_{tot}^{rx}} \tag{Eq. 3}$$

Then, the radio unit 101 may determine whether the relative received power loss is below a fourth determined threshold. Here, it should be noted that the relative received power loss relation in Eq. 3 may correspond to the path gain relation according to Eq. 4:

$$\frac{p_k^{rx}}{P_{tot}^{rx}} = \frac{g_k}{G_{tot}} \qquad \text{(Eq. 4)}$$

Thus, in case the received powers or path gains from the wireless devices in relation to the transceiver k, i.e. $p_k^{rx}$ or $g_k$, is relative low in comparison to the total received power, i.e. $P_{tot}^{rx}$ or $G_{tot}$, the radio unit 101 may consider the wireless devices to be relatively far away from the transceiver k and may turn off the transceiver k or reduce output power level for its DL transmissions.

Figure 3:
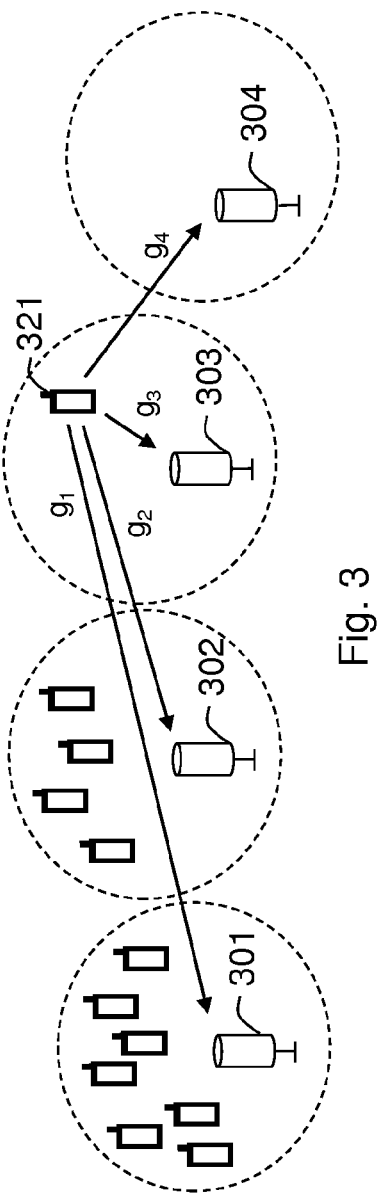
FIG. 3 is another schematic block diagram illustrating embodiments a radio unit in a wireless communications network.

This is further exemplified in FIG. 3. In the example of FIG. 3, the received power, or rather path gain, from the wireless device 321 of the transceivers 301, 302, 303, 304 is denoted $g_1$, $g_2$, $g_3$, $g_4$, respectively.

Assuming the following path gains, $g_1 = g_2 = 0.1$, $g_3 = 1.0$, and $g_4 = 0.2$, the loss in relative combined received power in case the transceiver 304 is turned off may be estimated by the radio unit 101 as:

$$\frac{g_4}{g_1 + g_2 + g_3 + g_4} = \frac{0.2}{1.4} = 0.15$$

Hence, if the fourth determined threshold in the radio unit 101 is higher than 0.15, i.e. 15% in this example, then the radio unit 101 may turn off the transceiver 304 or reduce output power level for its DL transmissions.

In some embodiments, when the at least one first transceiver is turned off, the radio unit 101 turns on the at least one first transceiver in case the determined load of the transceivers 110-119 in the wireless communications network 100 indicate that one or more wireless devices is approaching the at least one first transceiver. This means that the radio unit 101 may turn on a transceiver that is currently turned off when the first criterion is no longer considered fulfilled for the transceiver that is currently turned off, i.e. when the second criterion is fulfilled for the transceiver.

It should further be noted that a wireless device, which is switched on close to a transceiver that is currently turned off, will not trigger the transceiver to be turned on and the wireless device will not receive any system broadcast information from the transceiver. However, in this case, the wireless device may, for example, receive the system broadcast information from DL transmissions of a neighboring transceiver that is not turned off, whereby the wireless device may instead send a random access signal to the neighboring transceiver. This may trigger the radio unit 101 to turn on the transceiver again, since the first load condition may no longer be fulfilled for the transceiver.

FIG. 4 is another flowchart depicting embodiments of a method in a radio unit 101. FIG. 4 illustrates an example of actions or operations which may be taken by the radio unit 101. The method may comprise the following actions.

Action 401

The radio unit 101 may first identify the dominant transceivers of the transceivers 110-119 in the wireless communications network 100 by determining a load for each of the transceivers 110-119. This may be performed as described in Actions 201-202 with reference to FIG. 2.

Action 402

The radio unit 101 then determines if any of the transceivers 110-119 has a determined load that is below a first determined threshold $T_1$ in the radio unit 101; for example, the transceiver 110 in the load scenario of FIG. 1.

Action 403

If the load condition in Action 402 is valid for at least one of the transceivers 110-119, the radio unit 101 may determine if any adjacent transceivers of the at least one of the transceivers 110-119 has a determined load that is below a second or third determined threshold, $T_2$ or $T_3$, in the radio unit 101. For example, in the load scenario of FIG. 1, the radio unit 101 may determine if the determined loads of the neighboring transceivers 111, 119 of the transceiver 110 are equal to or below the second determined threshold $T_2$. Further, the radio unit 101 may determine if the determined loads of the transceivers 112, 118 being neighbors to the neighboring transceivers 111, 119 of the transceiver 110 are equal to or below the third determined threshold $T_3$.

Action 404

If the load conditions in Actions 402-403 are valid for at least one of the transceivers 110-119, the radio unit 101 may estimate the loss in relative combined received power for the at least one of the transceivers 110-119; for example, the transceiver 110 in the load scenario of FIG. 1. This may be performed as described in Action 203 with reference to FIG. 2.

Action 405

The radio unit 101 may then determine whether the estimated loss in relative combined received power for the at least one of the transceivers 110-119 is below a fourth determined threshold $T_4$ in the radio unit 101.

Action 406

If the load conditions for the at least one of the transceivers 110-119 as described in Actions 402-405 are valid, the radio unit 101 may turn off the at least one of the transceivers 110-119; for example, the transceiver 110 in the load scenario of FIG. 1.

Actions 407-408

The radio unit 101 may continuously check the load conditions for the at least one of the transceivers 110-119 as described in Actions 402-405 to determine whether these load conditions are still valid. If so, the radio unit 101 may keep the at least one of the transceivers 110-119 turned off; for example, the transceiver 110 in the load scenario of FIG. 1.

Action 408

If the load conditions for the at least one of the transceivers 110-119 as described in Actions 402-405 are no longer valid, the radio unit 101 may turn on the at least one of the transceivers 110-119.

To perform the method actions for controlling power levels of spatially separated transceivers 110-119 connected to the radio unit 101 via corresponding antenna ports a-j, the radio unit 101 may comprise the following arrangement depicted in FIG. 5.

FIG. 5 shows a schematic block diagram of embodiments of the radio unit 101. In some embodiments, the radio unit 101 may comprise a receiving module 501, a transmitting module 502, and a processor 510. The receiving module 501, which also may be referred to as a receiver or a receiving unit, may be configured to receive signals from the transceivers 110-119 via the corresponding antenna ports a-j. The transmitting module 502, which is also referred to as a transmitter or a transmitting unit, is configured to transmit signals to the transceivers 110-119 via the corresponding antenna ports a-j. The transceivers 110-119 may be antennas and/or radio heads, and may be located at specific geographical positions relative to each other.

The processor 510, which is also referred to as a processing module, a processing unit or a processing circuitry, may also control the receiver 501 and the transmitter 502. Optionally, the processor 810 may be said to comprise one or more of the receiver 501 and the transmitter 502 and and/or perform the function thereof as described below. According to some aspects, the processor 810 also comprises a determining module 511 and a controlling module 512.

The receiving module 501 is configured to receive measurements from the transceivers 110-119 on received uplink transmissions from the wireless devices. The processor 510 and/or the determining module 511 is configured to determine a load based on how many wireless devices that have the transceiver as the transceiver with the most relevant measurement for its uplink transmissions. Also, the processor 510 and/or the controlling module 512 is configured to control a power level of at least one first transceiver based on at least one of the determined loads for the transceivers 110-119. The most relevant measurement may be one or more of the highest received power, the highest signal-to-noise-ratio, or the highest signal quality.

In some embodiments, the processor 810 and/or the controlling module 512 may be further configured to turn off the at least one first transceiver when a first load criterion is fulfilled, and turn on the at least one first transceiver when a second load criterion is fulfilled. Alternatively, in some embodiments, the processor 810 and/or the controlling module 512 may be further configured to reduce the output power level for downlink, DL, transmissions of the at least one first transceiver 110 when a first load criterion is fulfilled, and increase the output power level for DL transmissions of the at least one first transceiver when a second load criterion is fulfilled.

According to some embodiments, the first load criterion may be considered fulfilled when the determined load for the at least one first transceiver is equal to or below a first determined threshold. In this case, the second load criterion may be considered fulfilled when the determined load for the at least one first transceiver is above the first determined threshold. Additionally, in some embodiments, the first load criterion may be considered fulfilled when the determined load for at least one second transceiver located adjacent to the at least one first transceiver is equal to or below a second determined threshold. In this case, the second load criterion may be considered fulfilled when the determined load for at least one second transceiver located adjacent to the at least one first transceiver is above the second determined threshold. Also, in some embodiments, the first load criterion may be considered fulfilled when the determined load for at least one third transceiver located adjacent to the at least one second transceiver is equal to or below a third determined threshold. In this case, the second load criterion may be considered fulfilled when the determined load for at least one third transceiver located adjacent to the at least one second transceiver is above the third determined threshold. Furthermore, in some embodiments, the first load criterion may be considered fulfilled when an estimated loss in relative combined received power of the uplink transmissions from the wireless devices to the transceivers 110-119 is equal to or below a fourth determined threshold. In this case, the second load criterion may be considered fulfilled when an estimated loss in relative combined received power of the uplink transmissions from the wireless devices to the transceivers 110-119 is above the fourth determined threshold. It should also be noted that any combination of the first, second, third and fourth thresholds may be used to determine if the first and second criterion is fulfilled.

In some embodiments, when the at least one first transceiver is turned off, the processor 810 and/or the controlling module 512 may be further configured to turn on the at least one first transceiver in case the determined load of the transceivers 110-119 in the wireless communications network 100 indicate that one or more wireless devices is approaching the at least one first transceiver.

The embodiments for allocating a subset of transmission resources that are shared between an access link 132, 134 and a back-haul link 131, 133 may be implemented through one or more processors, such as, e.g. the processor 810 in the first node 110, 121 depicted in FIG. 8, together with computer program code for performing the functions and actions of the embodiments herein. The program code mentioned above may also be provided as a computer program product, for instance in the form of a data carrier carrying computer program code or code means for performing the embodiments herein when being loaded into the processor 810 in the first node 110, 121. The computer program code may e.g. be provided as pure program code in the first node 110, 121 or on a server and downloaded to the first node 110, 121. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blueray disc, etc.

The first node 110, 121 may further comprise a memory 820, which may be referred to or comprise one or more memory modules or units. The memory 820 may be arranged to be used to store executable instructions and data to perform the methods described herein when being executed in or by the processor 810 of the first node 110, 121. Those skilled in the art will also appreciate that the processor 810 and the memory 820 described above may refer to a combination of analog and digital circuits, and/or one or more processors configured with software and/or firmware, e.g. stored in the memory 820, that when executed by the one or more processors, such as, the processor 810, cause the one or more processors to perform the method as described above. The processor 810 and the memory 820 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 810, cause the at least one processor to carry out the method for allocating a subset of transmission resources that are shared between an access link 132, 134 and a back-haul link 131, 133. Also, some embodiments may further comprise a carrier containing said computer program product, wherein the carrier is one of an electronic signal, optical signal, radio signal, or computer-readable storage medium.

The terminology used in the detailed description of the particular embodiments illustrated in the accompanying drawings is not intended to be limiting of the described radio unit 101 and method therein, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method, performed by a radio unit, for controlling power levels of spatially separated transceivers connected to the radio unit via corresponding antenna ports, wherein each transceiver is capable of performing measurements on uplink transmissions from wireless devices in a wireless communication network, the method comprising:
receiving signal quality measurements from the transceivers on received uplink transmissions from the wireless devices, wherein each signal quality measurement is indicative of a received signal quality of an uplink signal from one of the wireless devices to one of the transceivers;
computing a load for each transceiver based on the received signal quality measurements, wherein the load for each transceiver is computed as a number of wireless devices for which the received signal quality measured by the transceiver ranks as dominant compared to the received signal qualities measured by other transceivers; wherein dominant means having one or more of the highest received power, the highest signal-to-noise-ratio, and the highest signal quality; and
controlling a power level of a first transceiver based on the determined load for the first transceiver and the computed load of at least one other transceiver.

2. The method of claim 1, further comprising:
turning off the at least one first transceiver or reducing the output power level for downlink transmissions of the at least one first transceiver when a first load criterion is fulfilled; and
turning on the at least one first transceiver or increasing the output power level for downlink transmissions of the at least one first transceiver when a second load criterion is fulfilled.

3. The method of claim 2:
wherein the first load criterion is fulfilled when the determined load for the at least one first transceiver is equal to or below a first determined threshold; and
wherein the second load criterion is fulfilled when the determined load for the at least one first transceiver is above the first determined threshold.

4. The method of claim 3:
wherein the first load criterion is fulfilled when the determined load for at least one second transceiver located adjacent to the at least one first transceiver is equal to or below a second determined threshold; and
wherein the second load criterion is fulfilled when the determined load for at least one second transceiver located adjacent to the at least one first transceiver is above the second determined threshold.

5. The method of claim 3:
wherein the first load criterion is fulfilled when an estimated loss in relative combined received power of the uplink transmissions from the wireless devices to the transceivers is equal to or below a fourth determined threshold; and
wherein the second load criterion is fulfilled when an estimated loss in relative combined received power of the uplink transmissions from the wireless devices to the transceivers is above the fourth determined threshold.

6. The method of claim 4:
wherein the first load criterion is fulfilled when the determined load for at least one third transceiver located adjacent to the at least one second transceiver is equal to or below a third determined threshold; and
wherein the second load criterion is fulfilled when the determined load for at least one third transceiver located adjacent to the at least one second transceiver is above the third determined threshold.

7. The method of claim 1, further comprising, when the at least one first transceiver is turned off, turning on the at least one first transceiver in response to the determined load of the transceivers in the wireless communications network indicating that one or more wireless devices is approaching the at least one first transceiver.

8. The method of claim 1, wherein each of the transceivers are located at a specific geographical position relative to the other transceivers.

9. The method of claim 1, wherein dominant means having highest received power.

10. The method of claim 1, wherein the transceivers are antennas and/or radio heads.

11. A radio unit for controlling power levels of spatially separated transceivers connected to the radio unit via corresponding antenna ports, wherein each transceiver is capable of performing measurements on uplink transmissions from wireless devices in a wireless communication network, the radio unit comprising
a receiver configured to receive signal quality measurements from the transceivers on received uplink transmissions from the wireless devices, wherein each signal quality measurement is indicative of a received signal quality of an uplink signal from one of the wireless devices to one of the transceivers; and processing circuitry configured to:
compute a load for each transceiver based on the received signal quality measurements, wherein the load for each transceiver is computed as a number of wireless devices for which the received signal quality measured by the transceiver ranks as dominant compared to the received signal qualities measured by other transceivers; wherein dominant means having one or more of the highest received power, the highest signal-to-noise-ratio, and the highest signal quality; and control a power level of a first transceiver based on the determined load for the first transceiver and the computed load of at least one other transceiver.

12. The radio unit of claim 11, wherein the processing circuitry is further configured to:
turn off the at least one first transceiver or reduce the output power level for downlink transmissions of the at least one first transceiver when a first load criterion is fulfilled; and
turn on the at least one first transceiver or increase the output power level for downlink transmissions of the at least one first transceiver when a second load criterion is fulfilled.

13. The radio unit of claim 12:
wherein the first load criterion is fulfilled when the determined load for the at least one first transceiver is equal to or below a first determined threshold; and
wherein the second load criterion is fulfilled when the determined load for the at least one first transceiver is above the first determined threshold.

14. The radio unit of claim 12:
wherein the first load criterion is fulfilled when an estimated loss in relative combined received power of the uplink transmissions from the wireless devices to the transceivers is equal to or below a fourth determined threshold; and
wherein the second load criterion is fulfilled when an estimated loss in relative combined received power of the uplink transmissions from the wireless devices to the transceivers is above the fourth determined threshold.

15. The radio unit of claim 13:
wherein the first load criterion is fulfilled when the determined load for at least one second transceiver located adjacent to the at least one first transceiver is equal to or below a second determined threshold; and
wherein the second load criterion is fulfilled when the determined load for at least one second transceiver located adjacent to the at least one first transceiver is above the second determined threshold.

16. The radio unit of claim 15:
wherein the first load criterion is fulfilled when the determined load for at least one third transceiver located adjacent to the at least one second transceiver is equal to or below a third determined threshold; and
wherein the second load criterion is fulfilled when the determined load for at least one third transceiver located adjacent to the at least one second transceiver is above the third determined threshold.

17. The radio unit of claim 11, wherein the processing circuitry is further configured to, when the at least one first transceiver is turned off, turn on the at least one first transceiver in response to the determined load of the transceivers in the wireless communications network indicating that one or more wireless devices is approaching the at least one first transceiver.

18. The radio unit of claim 11, wherein each of the transceivers are located at a specific geographical position relative to the other transceivers.

19. The radio unit of claim 11, wherein dominant means having highest received power.

20. The radio unit of claim 11, wherein the transceivers are antennas and/or radio heads.

21. The radio unit of claim 11, further comprising memory containing instructions executable by the processing circuitry.

22. A non-transitory computer readable recording medium storing a computer program product for controlling power levels of spatially separated transceivers connected to a radio unit via corresponding antenna ports, wherein each transceiver is capable of performing measurements on uplink transmissions from wireless devices in a wireless communication network, the computer program product comprising software instructions which, when run on processing circuitry of the radio unit, causes the radio unit to:
receive signal quality measurements from the transceivers on received uplink transmissions from the wireless devices, wherein each signal quality measurement is indicative of a received signal quality of an uplink signal from one of the wireless devices to one of the transceivers;
compute a load for each transceiver based on the received signal quality measurements, wherein the load for each transceiver is computed as a number of wireless devices for which the received signal quality measured by the transceiver ranks as dominant compared to the received signal qualities measured by other transceivers; wherein dominant means having one or more of the highest received power, the highest signal-to-noise-ratio, and the highest signal quality; and
control a power level of a first transceiver based on the determined load for the first transceiver and the computed load of at least one other transceiver.

* * * * *